UNITED STATES PATENT OFFICE.

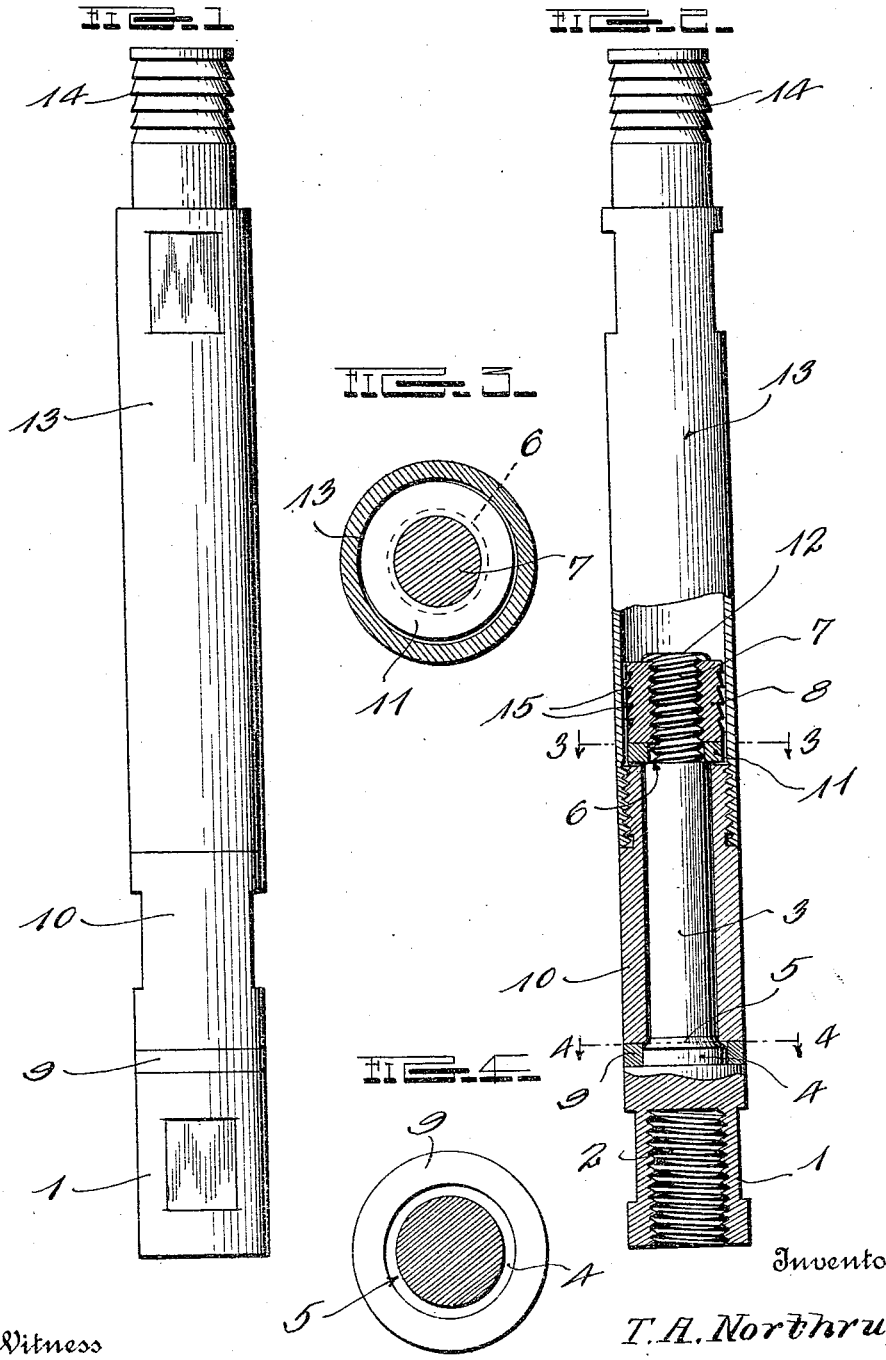

THOMAS A. NORTHRUP, OF PARKERSBURG, WEST VIRGINIA.

CABLE SWIVEL.

1,413,487.  Specification of Letters Patent.  Patented Apr. 18, 1922.

Application filed May 2, 1921. Serial No. 466,313.

*To all whom it may concern:*

Be it known that I, THOMAS A. NORTHRUP, a citizen of the United States, residing at Parkersburg, in the county of Wood and State of West Virginia, have invented certain new and useful Improvements in Cable Swivels; and I do declare the following to be a full, clear, and exact description of the invention, such as will enable others skilled in the art to which it appertains to make and use the same.

My invention relates to improvements in swivels and more particularly to those designed for attaching the usual operating cables to oil well pumps and the like. Swivels of the type commonly used for this purpose are provided at one end with a connection for attachment to the reciprocating pump part, a reduced stem rises from said connection, a sleeve rotatably surrounds the stem, a nut is threaded on the stem at the upper end of the sleeve, and a cable-carried tube encloses the nut and is threaded on the upper end of the sleeve. In this form of swivel, not only are the ends of the sleeve and the parts with which it contacts, subjected to great wear as the device moves alternately up and down, but such strain is placed upon the screw threads of the stem as to often strip them, necessitating removal of the entire cable in order that the damaged swivel part and associated parts may be withdrawn from the well by means of the usual fishing tool. The object of my invention however is to provide an improved form of swivel in which wear is reduced to the minimum and in which there is less strain placed upon the threads of the stem.

In the accompanying drawings which form part of this specification and in which like numerals are employed to designate like parts throughout the same:

Figure 1 is a side elevation of the swivel.

Figure 2 is a similar view partly in section.

Figures 3 and 4 are horizontal sections taken on lines 3—3 and 4—4 of Fig. 2.

In the drawings above briefly described, the numeral 1 designates a metal head having a threaded bore 2 by means of which a string of sinkers may be connected thereto, said sinkers serving as the usual connecting means between the swivel and the reciprocating pump part. Rising from and formed integrally with the head 1 is a stem 3 which is increased slightly in diameter at its lower end as indicated at 4, the juncture of the two diameters being preferably curved as indicated at 5. The upper end of the stem 3 is reduced in diameter to form an abrupt shoulder 6 and a threaded stud 7 extending beyond said shoulder, and the usual nut 8 is threaded on said stud.

A hard metal washer 9 surrounds the enlarged end 4 of the stem 3 and is shrunk thereon, said washer being in tight contact with the upper end of the head 1. The usual sleeve 10 rotatably surrounds the stem 3 but is formed of hard metal, said sleeve being of slightly less length than the distance between the upper surface of the washer 9 and the shoulder 6. A second hard metal washer 11 surrounds the stud 7 and rests on the shoulder 6, being held tightly in contact with said shoulder by the nut 8. Attention may here be directed to the fact that no matter how tightly the nut 8 is threaded against the washer 11, the latter cannot bind against the sleeve 10 and prevent rotation of the latter, as is the case with the common forms of swivels now used. The result is that the nut 8 of my invention may be threaded as tightly as possible against the washer 11 and consequently the stud 7 is not permitted any axial motion whatever within the nut, whereas if the nut is not threaded tightly against some part, the continual up and down movement of the sleeve 10 soon batters the screw threads sufficiently to allow slight axial motion of the nut 8 on the stud 7. When this motion once starts, it is only a short time before the screw threads are so badly hammered as to strip entirely and permit the stem 3, head 1 and associated parts to descend into the well. Since this cannot occur with my invention, it will be seen that I have produced a valuable advance in the art.

The upper end of the stud 7 is preferably upset to some extent as shown at 12, so as to lock the nut 8 against possible unthreading from the stud 7. Attention may here be invited to the fact that while it is common practice to upset the stud in this manner, this upsetting and the screw threads will not resist the pounding action of the tool as it continually moves upwardly and downwardly, unless the nut 8 is threaded tightly against a shoulder such as 6 or against a washer 11 bearing on this shoulder.

The upper end of the sleeve 10 is threaded into the lower end of the usual tube 13 in which the operating cable is secured by any preferred means, the upper end of this tube being provided with the well known ribs 14 for use in case it is necessary to fish it from the well. Also, in order to facilitate engagement of the fishing tool with the nut 8, if the sleeve 10 should accidentally unthread from the tube 13, said nut is preferably ribbed as indicated at 15.

The swivel operates in the well known manner but excessive lost motion is prevented by providing the hard metal washers 9 and 11 and the hardened steel sleeve 10, so that there can be little pounding upon the nut 8. What little pounding is exerted on this nut however is not sufficient to strip the screw threads thereof, due to the construction above set forth fully.

Excellent results have been obtained from the details disclosed and these details therefore are preferably followed. It is to be understood, however, that within the scope of the invention as claimed, numerous minor changes may be made.

I claim:

A swivel comprising a head, a central stem integral with and rising from said head, the upper end of said stem being reduced in diameter to form an abrupt shoulder and a stud extending above said shoulder, a hard metal washer surrounding the lower end of said stem and resting on said head, a sleeve rotatably surrounding the stem and resting on said washer, said sleeve being of slightly less length than the distance between the upper surface of said washer and said shoulder, a second hard metal washer surrounding the lower end of said stud and resting on said shoulder, the outer portion of said second washer being disposed in abutting relation with the upper end of said sleeve, a nut threaded on said stud and bound frictionally against said second washer, and a cable-carried tube surrounding said nut and second washer and threaded upon the upper end of said sleeve.

In testimony whereof I have hereunto set my hand.

THOMAS A. NORTHRUP.